US012591827B2

(12) United States Patent
Reineke et al.

(10) Patent No.: US 12,591,827 B2
(45) Date of Patent: Mar. 31, 2026

(54) ETHICAL CONFIDENCE FABRICS: MEASURING ETHICAL ALGORITHM DEVELOPMENT

(71) Applicant: Dell Products L.P., Round Rock, TX (US)

(72) Inventors: Nicole Reineke, Northborough, MA (US); Stephen J. Todd, North Andover, MA (US)

(73) Assignee: Dell Products L.P., Round Rock, TX (US)

( * ) Notice: Subject to any disclaimer, the term of this patent is extended or adjusted under 35 U.S.C. 154(b) by 1107 days.

(21) Appl. No.: 17/648,629

(22) Filed: Jan. 21, 2022

(65) Prior Publication Data

US 2023/0237403 A1    Jul. 27, 2023

(51) Int. Cl.
| | |
|---|---|
| *G06Q 10/0633* | (2023.01) |
| *G06N 5/02* | (2023.01) |
| *G06N 5/04* | (2023.01) |
| *G06Q 10/0639* | (2023.01) |
| *G06Q 10/067* | (2023.01) |

(52) U.S. Cl.
CPC ........... *G06Q 10/0633* (2013.01); *G06N 5/02* (2013.01); *G06N 5/04* (2013.01); *G06Q 10/06393* (2013.01); *G06Q 10/067* (2013.01)

(58) Field of Classification Search
CPC ......... G06Q 10/0633; G06Q 10/06393; G06Q 10/067; G06N 5/02; G06N 5/04
See application file for complete search history.

(56) References Cited

U.S. PATENT DOCUMENTS

| | | | | |
|---|---|---|---|---|
| 11,438,359 | B2 * | 9/2022 | Todd .................... | H04L 63/1433 |
| 12,093,653 | B2 * | 9/2024 | Takahashi ............. | G06F 40/242 |
| 2017/0032265 | A1 * | 2/2017 | Ingerson ................ | G16H 50/20 |
| 2020/0380398 | A1 * | 12/2020 | Weider .................. | G06F 16/285 |
| 2020/0380399 | A1 * | 12/2020 | Weider .................. | G06F 16/285 |
| 2021/0097447 | A1 * | 4/2021 | Kashiyama ............ | G06N 20/00 |
| 2021/0124817 | A1 * | 4/2021 | Todd ....................... | G06F 21/44 |
| 2021/0158221 | A1 * | 5/2021 | Marlin .................. | G06F 11/079 |
| 2021/0201179 | A1 * | 7/2021 | Sghiouer ............... | G06N 20/00 |
| 2021/0299576 | A1 * | 9/2021 | Donovan ............... | A63F 13/79 |
| 2022/0012591 | A1 * | 1/2022 | Dalli ..................... | G06N 3/082 |
| 2022/0076080 | A1 * | 3/2022 | Hacmon ............... | G06N 20/00 |
| 2022/0172099 | A1 * | 6/2022 | Das ....................... | G06N 20/00 |
| 2022/0237565 | A1 * | 7/2022 | Dzierzanowski .... | G06Q 30/018 |
| 2022/0335340 | A1 * | 10/2022 | Moustafa .............. | G06N 20/00 |
| 2022/0351073 | A1 * | 11/2022 | Wu ........................ | G06N 20/00 |
| 2022/0414237 | A1 * | 12/2022 | Lally ..................... | G06N 20/00 |
| 2023/0004858 | A1 * | 1/2023 | Santhanagopal ......... | G06F 8/20 |
| 2023/0080851 | A1 * | 3/2023 | Zoldi .................... | G06N 3/045 |
| | | | | 706/15 |

(Continued)

*Primary Examiner* — Jeremy L Stanley
(74) *Attorney, Agent, or Firm* — Workman Nydegger

(57) ABSTRACT

One example method includes formulating a hypothesis for development of computing model, annotating the hypothesis with ethics metadata, storing the hypothesis and the ethics metadata, in association with each other, in a ledger, performing 'n' phases of a development lifecycle for the computing model, annotating each of the 'n' phases with ethics metadata specific to the phase, updating the ledger to include the 'n' phases and the ethics metadata respectively associated with each of the 'n' phases, and calculating an ethics confidence score for the computing model.

20 Claims, 7 Drawing Sheets

(56) References Cited

U.S. PATENT DOCUMENTS

| | | | | |
|---|---|---|---|---|
| 2023/0110815 A1* | 4/2023 | Donovan | ............... | G06N 20/00 |
| | | | | 706/12 |
| 2023/0111112 A1* | 4/2023 | Donovan | ........ | G06Q 10/06393 |
| | | | | 706/12 |
| 2023/0114826 A1* | 4/2023 | Donovan | ........ | G06Q 10/06393 |
| | | | | 706/11 |
| 2023/0130389 A1* | 4/2023 | Yokoyama | ............ | G06N 20/00 |
| | | | | 706/12 |
| 2023/0177362 A1* | 6/2023 | Okada | ................... | G06N 5/045 |
| | | | | 706/52 |
| 2023/0186535 A1* | 6/2023 | Malur Srinivasan | ........................ | |
| | | | | G06F 40/247 |
| | | | | 345/441 |
| 2023/0237774 A1* | 7/2023 | Suzuki | ................... | G06N 20/00 |
| | | | | 382/157 |
| 2024/0195701 A1* | 6/2024 | Subramanya | ......... | H04L 41/145 |
| 2025/0114711 A1* | 4/2025 | Donovan | ............... | G06N 3/045 |

* cited by examiner

100

DATA ANALYTICS LIFECYCLE

First-time home-buyers will
spend...

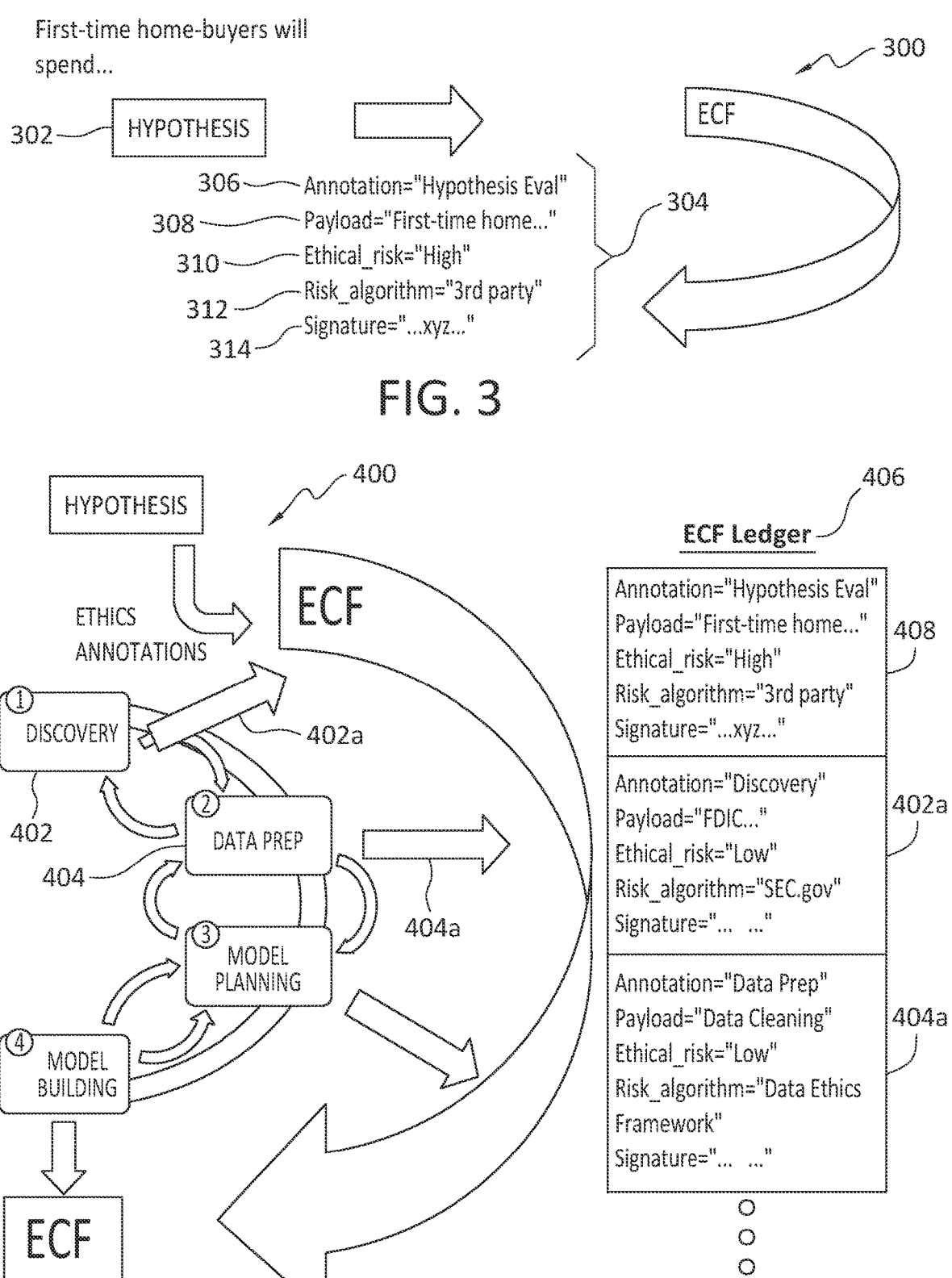

302 — HYPOTHESIS

300

ECF

304

306 — Annotation="Hypothesis Eval"
308 — Payload="First-time home..."
310 — Ethical_risk="High"
312 — Risk_algorithm="3rd party"
314 — Signature="...xyz..."

FIG. 3

HYPOTHESIS

400

ETHICS
ANNOTATIONS

ECF

① DISCOVERY

402a

402

404

② DATA PREP

404a

③ MODEL
PLANNING

④ MODEL
BUILDING

ECF

406
ECF Ledger

Annotation="Hypothesis Eval"
Payload="First-time home..."
Ethical_risk="High"
Risk_algorithm="3rd party"
Signature="...xyz..."          408

Annotation="Discovery"
Payload="FDIC..."
Ethical_risk="Low"
Risk_algorithm="SEC.gov"
Signature="...  ..."          402a Annotation="Data Prep"
Payload="Data Cleaning"
Ethical_risk="Low"
Risk_algorithm="Data Ethics
Framework"
Signature="...  ..."          404a

FIG. 4

ETHICAL CONFIDENCE FABRICS: MEASURING ETHICAL ALGORITHM DEVELOPMENT

FIELD OF THE INVENTION

Embodiments of the present invention generally relate to processes for development of algorithms. More particularly, at least some embodiments of the invention relate to systems, hardware, software, computer-readable media, and methods for creating and using an ethical confidence fabric that may be used to assess the ethics of algorithms and the processes used to develop them.

BACKGROUND

It was noted in one article that 'Undergraduate data science degrees emphasize computer science and statistics but fall short in ethics training and domain-specific context . . . " See https://peerj.com/articles/cs-441/ (Jeffrey C. Oliver, Torbet McNeil, Mar. 25, 2021). Put another way, some data scientists are entering the workforce with little to no training in computer science topics such as privacy or bias. The aforementioned report goes on to state that only half of the programs studied offered any courses at all related to ethics. This suggests that businesses may be employing engineers and scientists who are unaware of how not to build unethical algorithms. Moreover, even if data engineers and scientists have received some sort of training in the field of AI (Artificial Intelligence) ethics, those engineers and scientists may still make significant mistakes in the process of creating algorithms, with the result that such algorithms may cause some harm to society, or at least to the business that intends to use the algorithm in its operations.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

FIG. 3 discloses a process for registering hypothesis ethical risk in an ECF.

FIG. 4 discloses example annotations that may be added during a model development lifecycle.

DETAILED DESCRIPTION OF SOME EXAMPLE EMBODIMENTS

Figure 1:
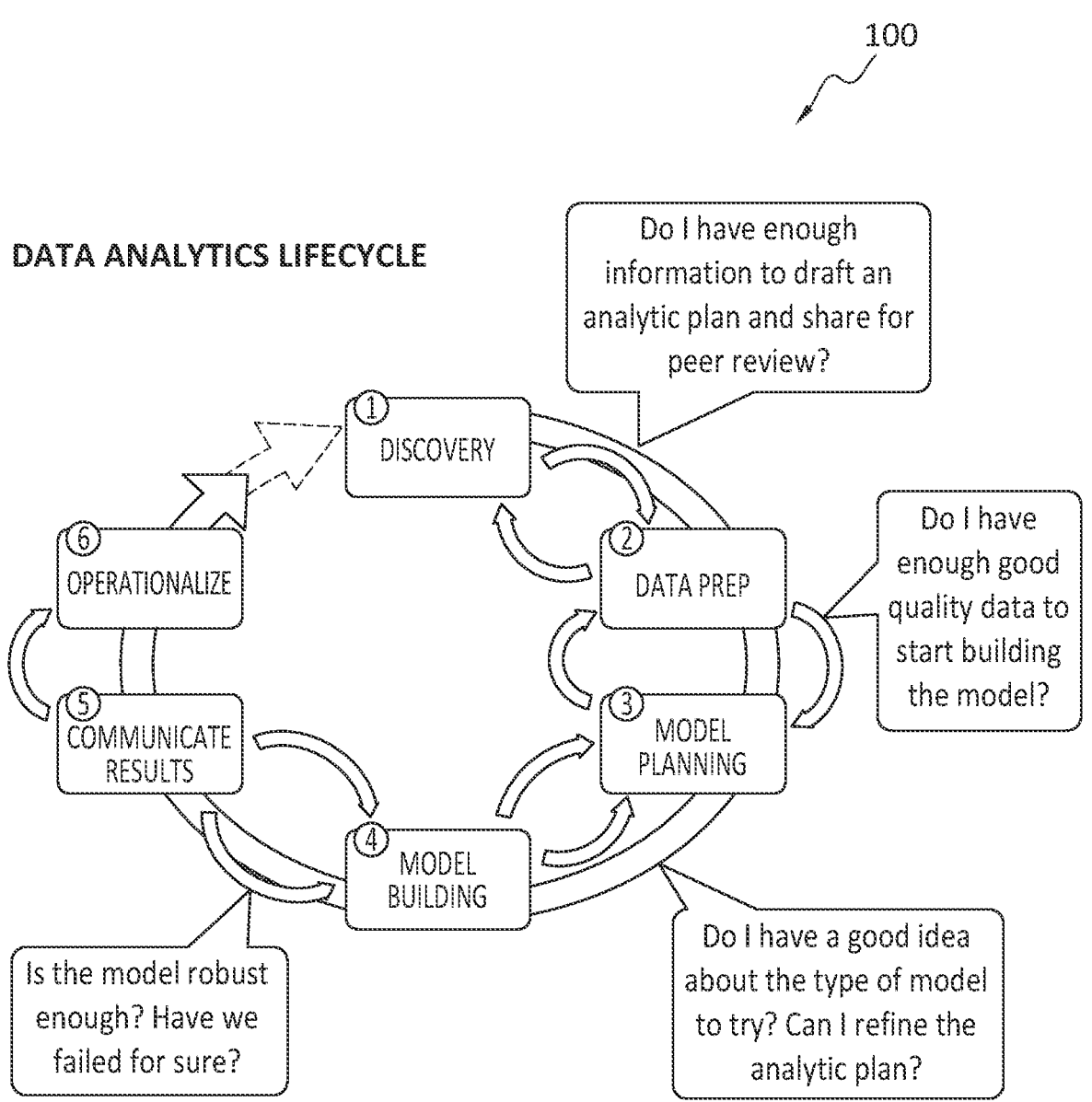
FIG. 1 discloses aspects of an example algorithm development lifecycle.

Embodiments of the present invention generally relate to processes for development of algorithms. More particularly, at least some embodiments of the invention relate to systems, hardware, software, computer-readable media, and methods for creating and using an ethical confidence fabric that may be used to assess the ethics of algorithms and the processes used to develop them.

In general, example embodiments of the invention may involve the use of an ECF (ethics confidence fabric) that may be used to make annotations at various stages of the development cycle of an algorithm. The annotations may embody various ethical considerations, as well as assessments as to how a particular stage in the lifecycle comports with such ethical considerations, and what possible ethical risks or problems may be associated with that particular stage. At the conclusion of the development cycle for the algorithm, an overall ethical confidence score (ECS) may be created and assigned to the algorithm that has been created. Among other things, the ethical confidence score may be used to guide the use, or non-use, of the algorithm, and/or may be used to guide a modification process in which the algorithm is modified so as to better conform with applicable ethical standards.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

In particular, an embodiment may help to ensure the ethical development and use of algorithms by public and private enterprises. An embodiment may enable after-the-fact assessment, and modification, of an algorithm for improved compliance with specified ethical standards and considerations. An embodiment may guide an enterprise in the selection and use of algorithms meeting applicable ethical standards. An embodiment may improve awareness in an organization of ethical development and deployment standards and considerations for algorithms developed and/or used by the organization. Various other advantageous aspects of some example embodiments will be apparent from this disclosure.

It is noted that embodiments of the invention, whether claimed or not, cannot be performed, practically or otherwise, in the mind of a human. Accordingly, nothing herein should be construed as teaching or suggesting that any aspect of any embodiment of the invention could or would be performed, practically or otherwise, in the mind of a human. Further, and unless explicitly indicated otherwise herein, the disclosed methods, processes, and operations, are contemplated as being implemented by computing systems that may comprise hardware and/or software. That is, such methods processes, and operations, are defined as being computer-implemented.

A. Overview

A development lifecycle of an algorithm, also referred to herein as a 'model,' may involve a variety of stages and operations. With reference to FIG. 1, one example development lifecycle 100 for an algorithm is disclosed. The particular example of FIG. 1 concerns a development lifecycle for a data analytics algorithm. From the perspective of a business entity that is developing the algorithm, this lifecycle may begin with a business hypothesis, and then move through various stages, such as:

Step 1: discovering data that can help prove that business hypothesis;

Step 2: performing data engineering tasks that explore the data;

Step 3: starting model planning to address the hypothesis;

Step 4: building a model that proves/disproves the hypothesis;

Step 5: communicating the success/failure of the model; and

Step 6: conditionally deploying the model in a production, or live, environment, if the model is expected to bring business success.

While this approach, viewed strictly from a scientific or mathematical viewpoint, has proven effective, this approach may neglect a variety of ethical considerations, with the result that while the approach may result in a technically adequate algorithm, that algorithm may not adequately reflect, if at all, applicable ethical considerations. Following is a detailed discussion of some problems that are, and/or may be, faced by scientists and engineers in their development of an ethically compliant algorithm.

One of such problems concerns the lack of awareness of risky hypotheses. Particularly, there may be some hypotheses, such as those related to hiring or loan approval for example, that are high-risk when it comes to the associated opportunity that the scientist is attempting to validate. As well, there are a large number of areas where the relationship between a hypothesis and potential ethical conflicts is non-obvious. Consider an automated sprinkler system algorithm hypothesis which, from the start, does not take into account drought conditions, or human water needs, in the geographical area where the associated sprinkler system is expected to operate. It is unlikely that the scientist creating the algorithm would consider, or think to consider, drought conditions when developing the algorithm, since the focus is much more likely to be on creation of an algorithm that will meet established technical requirements.

Another problem that may be encountered in conventional algorithm development lifecycles concerns no, or an attenuated, link between the ethics of the model ultimately developed and the original hypothesis that was the genesis for the development of the model. Particularly, even if the relationship between a hypothesis and ethics is initially considered, the original hypothesis can be forgotten or altered during the analytic lifecycle. This drift from the original experiment can unknowingly introduce ethical violations into the analytic process that may go undetected all the way through to the model operationalization stage.

Still other problems that may be faced by personnel attempting to create an algorithm concern ethics-unaware data discovery. In particular, data discovery can focus on the search for data features only, and neglect important ethical considerations, such as, but not limited to:

Is the source of the data unknown, or is the data produced by an ethically reputable (or unreputable) organization?;

Is the provenance or lineage of the data source and the data fully documented by a trusted authority or third party?; and Does the data come with a statement of bias or other ethics-related metadata?

Further problems relate to ethics-unaware data engineering. For example, when a potentially-relevant data set has been discovered and downloaded, the data may undergo a set of data preparation operations such as exploration, cleaning, and transformation. There are a set of ethical steps that may be, but typically are not, taken during a data preparation phase. One of the, most-ignored, key steps that can be taken is to explore the data for potential bias. Checking for bias is not only a skill that few people have, but it can be viewed as a time-consuming step that delays the ultimate goal of proving/disproving a hypothesis. Another important data preparation operation is cleaning or transforming the data. While this step can greatly assist analytic models in their quest to help the business, it can also cause ethical damage by, for example, such as by introducing bias, removing key ethical fields, rows, or columns, from the data. Finally, data cleaning and/or data transformation processes are often undocumented, leaving the data scientist blind as to the ethical journey, if any, that the data has taken.

Model developers such as engineers and scientists may unwittingly employ ethics-unaware model planning and development processes. Data scientists have a huge catalog of mathematical approaches at their disposal when considering how best to prove a hypothesis with the data given to them. Unfortunately, they are often unaware of the potential ethical pitfalls that may be associated with any given mathematical approach to data preparation and/or model development. Furthermore, as they explore common mathematical approaches, analytics workbench software that scientists use likely does not have ethical guardrails that can warn the data scientists when they may be heading into dangerous ethical territory. One of the key reasons that these ethical guardrails may not be in place is the fact that the relationship back to the original business hypothesis, and any ethical concerns that the hypothesis might raise, has been lost, is unknown, or ignored. Similarly, the model development environment may have no context of the ethical steps taken during the discovery/download of the data upon which the model is to be based, nor is that environment aware as to whether or not the data engineering operations were performed in an ethical manner. As a result, data scientists may unknowingly commit ethics violations during their algorithm development and deployment processes.

Another concern with conventional model development processes relates to the communication/visualization of an ethics-unaware hypothesis that was the basis for development of the model. For example, when a model reaches completion, a decision needs to be made. This decision often lies in the hands of business executives who may or may not be aware of the original hypothesis. The results of the model are often shown without any ethical context for the model and/or the results achieved with the model. As such, decisions may be made to operationalize the model for the benefit of the business, unknowingly causing harm to society, or introducing risk to the business, because the model was deployed without reference to any ethical guidelines.

A final concern relating to development of algorithms is the operationalizing, or deployment, of algorithms that fail to conform, in some way, with applicable ethical standards. Particularly, if an unethical algorithm is deployed by a business, the algorithm may cause harm to society, or adversely impact the bottom line of the company, for example. An audit of the algorithm development lifecycle could expose any lack of ethical rigor during the development process. In fact, it is possible, before deployment, for an ethics-savvy team to conduct an audit or inspection of the algorithm, although this is rarely, if ever, done.

B. Aspects of Some Example Embodiments

Data science is the process of creating algorithms that prove/disprove hypotheses, through the discovery, wrangling, analysis, and visualization of data. One example of such an algorithm is an analytical model that is operable to analyze datasets. These algorithms may, knowingly or unknowingly, produce biased or unethical insights that may cause various types of harm, such as by hurting society, or damaging businesses, for example. Thus, at least some example embodiments embrace automated methods for calculating an "ethics score" for an algorithm that provides a relative indication as to the extent to which the development of the algorithm, and/or the algorithm itself, conform to one or more applicable ethical standards. This approach may take advantage of the benefits offered by an edge-based technology, such as the technology that has been employed in the creation and use of DCFs (Data Confidence Fabrics) and may create methods and techniques for calculating AI (Artificial Intelligence) ethics scores.

B.1 DCF/ECF

Figure 2:
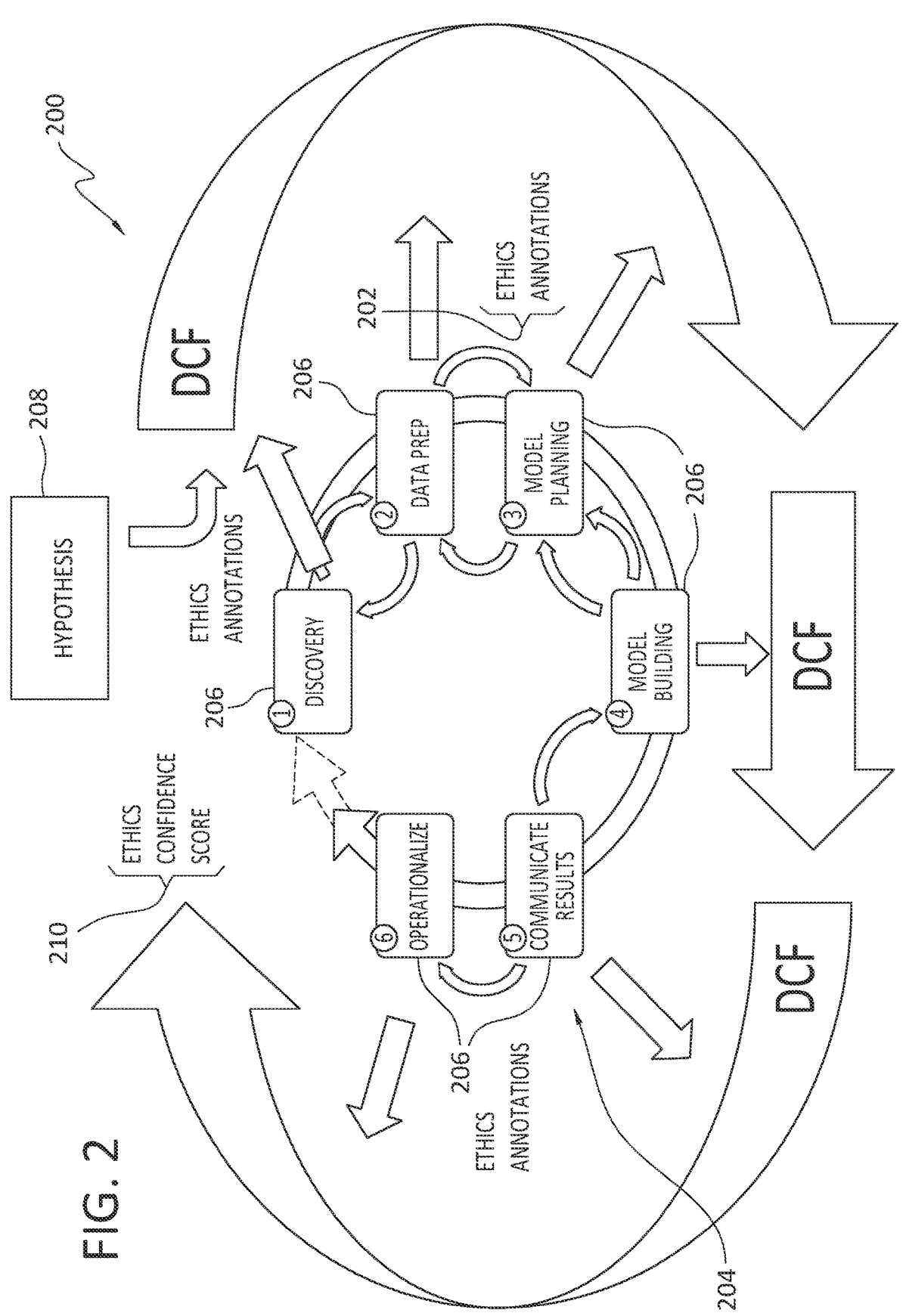
FIG. 2 discloses aspects of the use of a data confidence fabric (DCF) to generate an ethics confidence score (ECS).

FIG. 2 depicts the integration of an example data science analytic life cycle with a DCF. In general, the DCF may operate to annotate and score data, with confidence metadata, as that data flows through an edge hardware ecosystem. The confidence metadata may indicate an extent to which confidence can be had that the data, and/or the source of the data, are trustworthy and reliable. For example, confidence metadata may indicate a relatively high level of confidence in the integrity of data that was generated by a data source that implements data security measures.

In more detail, the DCF may be used to annotate data as that data flows from an edge device, such as a sensor for example, through an edge ecosystem, to a gateway, to an edge server, to a cloud, and, finally, to an application. While the data is in transit, any trustworthy, or untrustworthy, handling of the data is annotated, the annotations are gathered in a "sidecar" that may be used to generate a "data confidence score." When an application, or other prospective end user of the data, finally analyzes this data, the application may inspect the confidence score, along with any annotations associated with that confidence score.

As described below, the basic concept underlying a DCF concept may, in some example embodiments, be extended herein to operate as a sidecar alongside the data analytic lifecycle. In fact, the DCF concept, when applied to an algorithm development lifecycles, may be referred to herein as an ECF (Ethical Confidence Fabric).

With particular reference to the example of FIG. 2, an example DCF 200 is disclosed. As shown, ethics annotations 202 may be applied to algorithm development lifecycle 204 at various stages 206 of that lifecycle 204. The stages 206 may be similar, or identical, to the stages disclosed in FIG.

1. While not specifically shown, ethics annotations 202 may also be applied to the initial hypothesis 208 that was the basis for creation of the algorithm. The output of the example embodiment disclosed in FIG. 2 may be an ECS (Ethical Confidence Score) 210 that may be assigned to the algorithm that has been developed. Particularly, and as described below, this ECS, along with the annotations that were the basis for its generation, may be associated with an analytic model that has been created, and stored in an AI ethics store.

B.2 Application of ECF Concepts to Algorithm Development

With reference now to FIG. 3, details are provided concerning an example of how an initial process of hypothesis registration may be augmented with ethics annotations through the use of an ECF 300.

Particularly, when a data science project begins, a hypothesis 302 of the project may be generated and recorded into the ECF 300. The hypothesis 302 may be associated with various metadata 304 that may also be recorded into the ECF 300. Such metadata 304 may include, for example, an annotation 306 indicating the operations to be performed regarding the hypothesis 302, such as hypothesis evaluation ('hypothesis eval'). A payload 308 may indicate what the hypothesis is ('first time home-buyers will spend X on . . . '). Thus, in this illustrative case, the hypothesis 302 concerns the spending habits of 'first time home-buyers.'

The metadata 304 may further include an evaluation 310 as to how high of an ethical risk the hypothesis 302 might represent. Given, in the illustrative example of FIG. 3, that the hypothesis 302 concerns the spending habits of first-time home buyers, the potential ethical risk identified by the evaluation 310 may be assessed as high, reflecting a conclusion that financial profiling, such as may be performed in connection with a loan process, may be particularly prone to ethical bias.

In the example of FIG. 3, the metadata 304 further comprise information 312 comprising the name of, and results generated by, a 3rd party risk assessment tool that may have been run against the hypothesis 302. The 3rd party risk assessment tool may stand behind its risk analysis by digitally signing the annotation 306. The digital signature 314 affixed to the annotation 306 by the 3rd party risk assessment tool may raise the overall ethical confidence score of the hypothesis 302 if the 3rd party is known to be highly trustworthy. Other trustworthy entities may sign the annotation 306 as well.

With reference next to FIG. 4, a model development lifecycle 400 may comprise two additional example phases, namely, data discovery 402 and data preparation 404. As shown, further metadata 402a and 404a, which may include various annotations, may be added by the data discovery 402 and data preparation 404 phases, respectively, to an ECF ledger 406.

In the illustrative example of FIG. 4, during the data discovery phase 402, the data engineer or curator downloaded data from the "FDIC" (Federal Deposit Insurance Corporation) organization. This data set was confirmed by the Security and Exchange Commission ("SEC.gov") as a "Low Risk" download, meaning that the SEC has analyzed this data set previously and can assure that the data itself has undergone an ethical risk analysis. Further, during the data prep phase 404, a data cleaning tool was used, and this tool was certified by the data.gov Data Ethics Framework as an ethically-approved piece of software. Respective metadata may be added to the ECF ledger 406 for each of the other phases of the model development lifecycle 400, although it is not required that the ECF ledger 406 include metadata for any particular phase, or group of phases. Nor is it required that the metadata for a phase include any particular metadata. With continued reference to FIG. 4, and to the example of FIG. 3 discussed above, the ECF ledger 406 may also include various metadata 408, examples of which were discussed with reference to FIG. 3, relating to a hypothesis 410 that was the basis for instantiation of the model development lifecycle 400.

More generally, the ECF ledger 406 may include respective metadata for each phase of the model development lifecycle 400. Such metadata may include, for example, various annotations relating to respective phases of that model development lifecycle 400. In this way, the ECF ledger 406 may be updated, possibly in real time, on an ongoing basis as model development proceeds. Thus, an ethical confidence score may be generated for the model at any point during the model development lifecycle 400. Further, a respective ethical confidence score may be generated for any single phase, or subset of phases, of the model development lifecycle 400. This approach may, for example, help to identify whether there are one or more particular phases of a development lifecycle that are chronically prone to ethical problems, and should thus be subjected to careful review.

Figure 5:
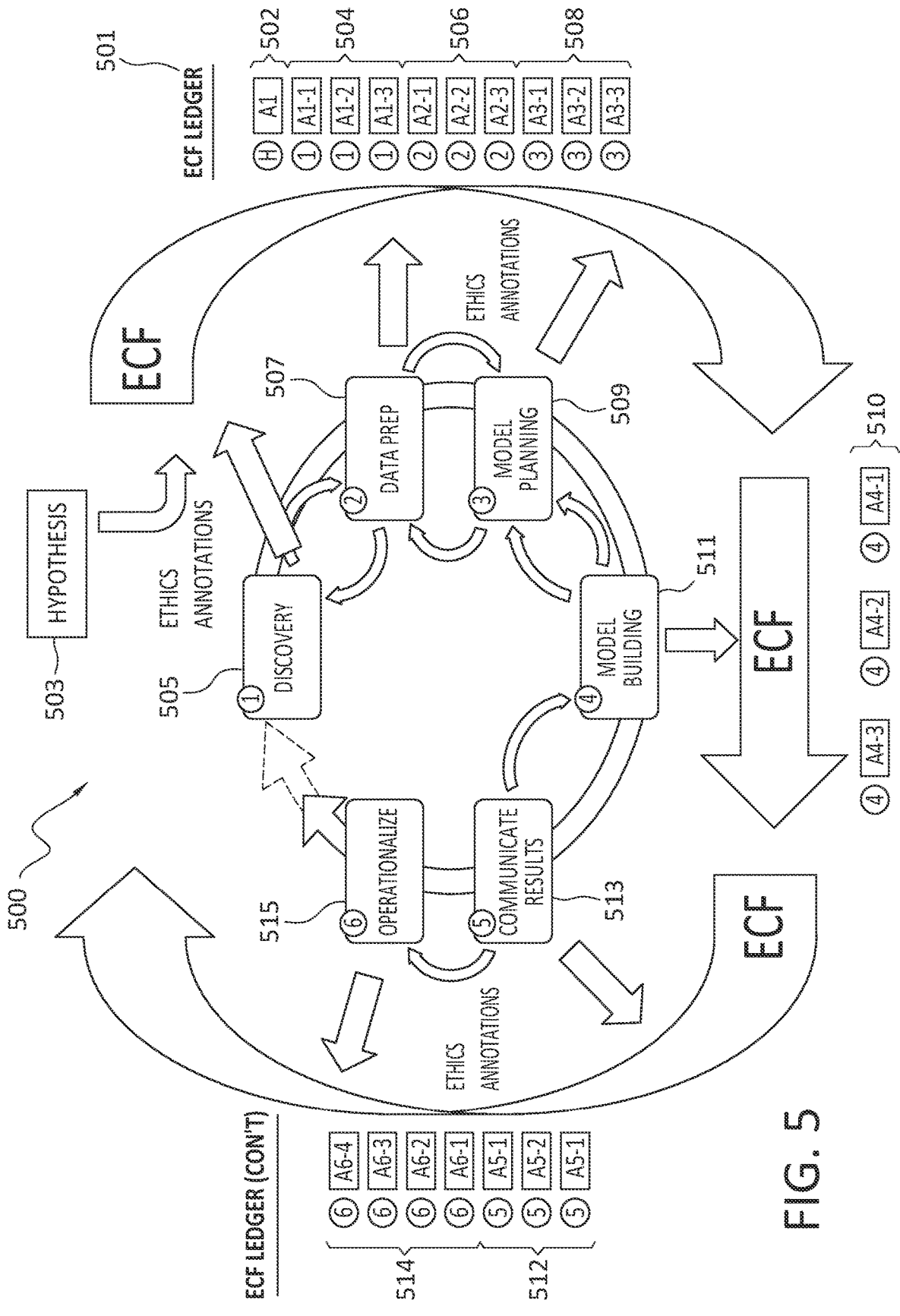
FIG. 5 discloses an example full set of ECF ledger entries at the end of an algorithm development lifecycle.

With reference next to FIG. 5, it can be seen that a complete set of ledger entries, comprising ethics annotations, have been made into a ledger 501, covering all phases of the algorithm development lifecycle 500. Particularly, the ledger entry 502 concerns the hypothesis 503, the ledger entries 504 concern the data discovery phase 505, the ledger entries 506 concern the data preparation phase 507, ledger entries 508 concern the model planning phase 509, the ledger entries 510 concern the model building phase 511, the ledger entries 512 concern the results communication phase 513, and the ledger entries 514 concern the operationalization, or implementation, phase 515. Note that no ledger entries, or any particular ledger entries, are required for any particular phase or phases of the algorithm development lifecycle 500. In general however, a greater number of ledger entries may tend to provide a more granular, that is, more accurate, picture of the ethical context for part or all of the algorithm development lifecycle 500. In some embodiments, one or more entries may be immutably recorded into the ledger 501.

Figure 6:
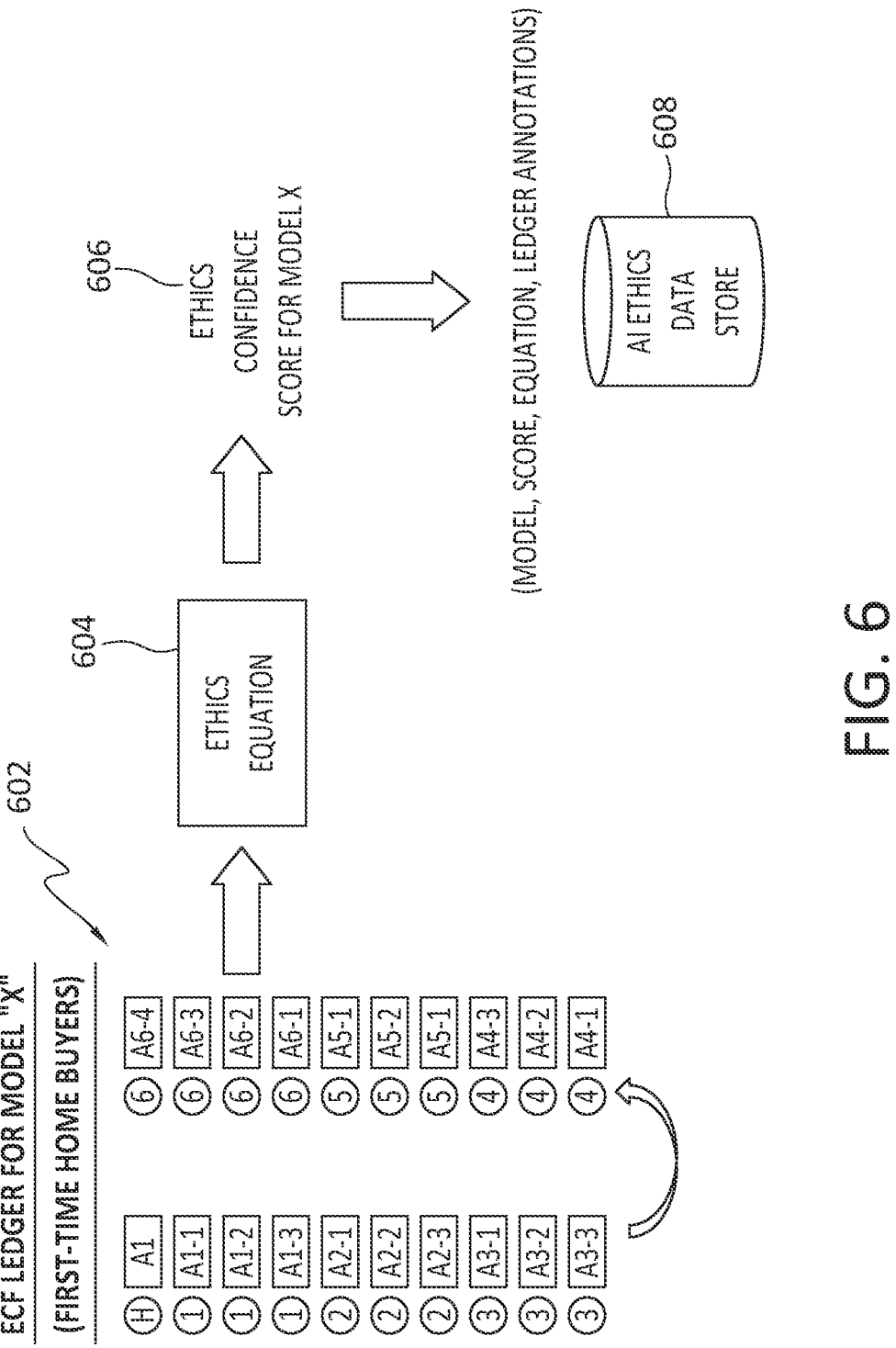
FIG. 6 discloses an example approach for calculation of an ECS, and association and storage of the ECS and a model in an AI ethics data store.

At the end of an algorithm development lifecycle, the algorithm or model may be ready, at least from a technical perspective, though possibly not from an ethical perspective, for deployment within an enterprise. With reference now to FIG. 6, once a ledger 602 has been updated to include the set of ledger entries, an ethics equation 604 may be used to calculate an Ethics Confidence Score (ECF) 606, which may then be programmatically assigned to the model as the model is placed into an AI ethics store 608. As shown in FIG. 6, the ethics equation 604 and/or ledger annotations may also be stored in the AI ethics store 608 in association with the model.

With continued reference to the example of FIG. 6, there are various ways to calculate the ECS 606. For example, one way to calculate an ECS, such as the ECS 606, is to run an algorithm across all the ledger entries, or across a specified subset of the ledger entries. FIG. 6 depicts an example of this approach. An ethics equation 604 may be implemented in any number of ways, that may be relatively simple, or relatively complex, depending on the circumstances. Some example approaches may include:

Sum the number of annotations, with the resulting sum serving as the ECS;

Sum the number of annotations, but weight certain annotations more heavily than others—for example, data prep may be deemed to be twice as important as all other phases of the algorithm development lifecycle, or model selection and model development may be deemed to be 3 times more important than all other phases;

The signing authority, such as the SEC for example, may also cause a higher ECS to be established, based on the ethical reputation of that authority; and If certain tools are annotated during certain steps—for example, a trusted "Data Wrangling" package—a relatively higher ECS may result in a higher score, and when an untrusted tool is used, a relatively lower ECS may result.

An enterprise, and/or an external authority, may make a determination as to what does, and does not, constitute an acceptable ECS. Such determinations may change over time. Note that if an enterprise should choose not to deploy a model, or a particular version of a model, the corresponding ledger entry may still be kept and used for other purposes, such as to document a history of all previous data analytic lifecycle attempts, for example.

C. Further Discussion

As will be apparent from this disclosure, example embodiments may possess various useful features and functionalities. For example, embodiments may operate to create an ethical annotation ontology/schema for use in part, or all, of an algorithm or model development lifecycle. Particularly, a list of possible annotations for each step in the data science model development life cycle may be created. Each ontology label may ultimately be fed into an equation for generation of an ECS.

As another example, one or more embodiments may provide for integration of ethical assessments, with a model development lifecycle, by way of an ECF. For example, each phase in a data analytic model development lifecycle may connect, and integrate, with an ECF, so that during the analytic model life cycle process, call-out annotations comprising ethical metadata may be made that are associated with an original hypothesis upon which the analytic model life cycle process is based. Each annotation may be associated with a specific identifier, for example, a hash value representing the hypothesis or the hypothesis ledger entry address to enable identification of the annotations associated with a particular model development lifecycle, and associated model. Ledger entries may be digitally signed by trusted authorities as a way of further increasing ethical confidence in the model development process, and in the model itself.

Further, one or more embodiments may provide for the calculation of an ethics confidence score (ECS) based on ethics annotations made to one or more phases of a model development process. For example, an ethics equation may be created that searches the ethical confidence ledger for entries. These entries feed variables into the equation, resulting in the calculation of an overall ethical confidence score for the model development process as a whole, or for a specified subset of the phases of the model development process.

As a final example, some embodiments may implement association of the ethics confidence score with the model, and storage of the ECS and that association together in an AI ethics datastore. Additional metadata may be associated with these the ECS and the model including, for example, the ECS equation and the ledger entries, or a specified subset of the ledger entries.

D. Example Methods

Figure 7:
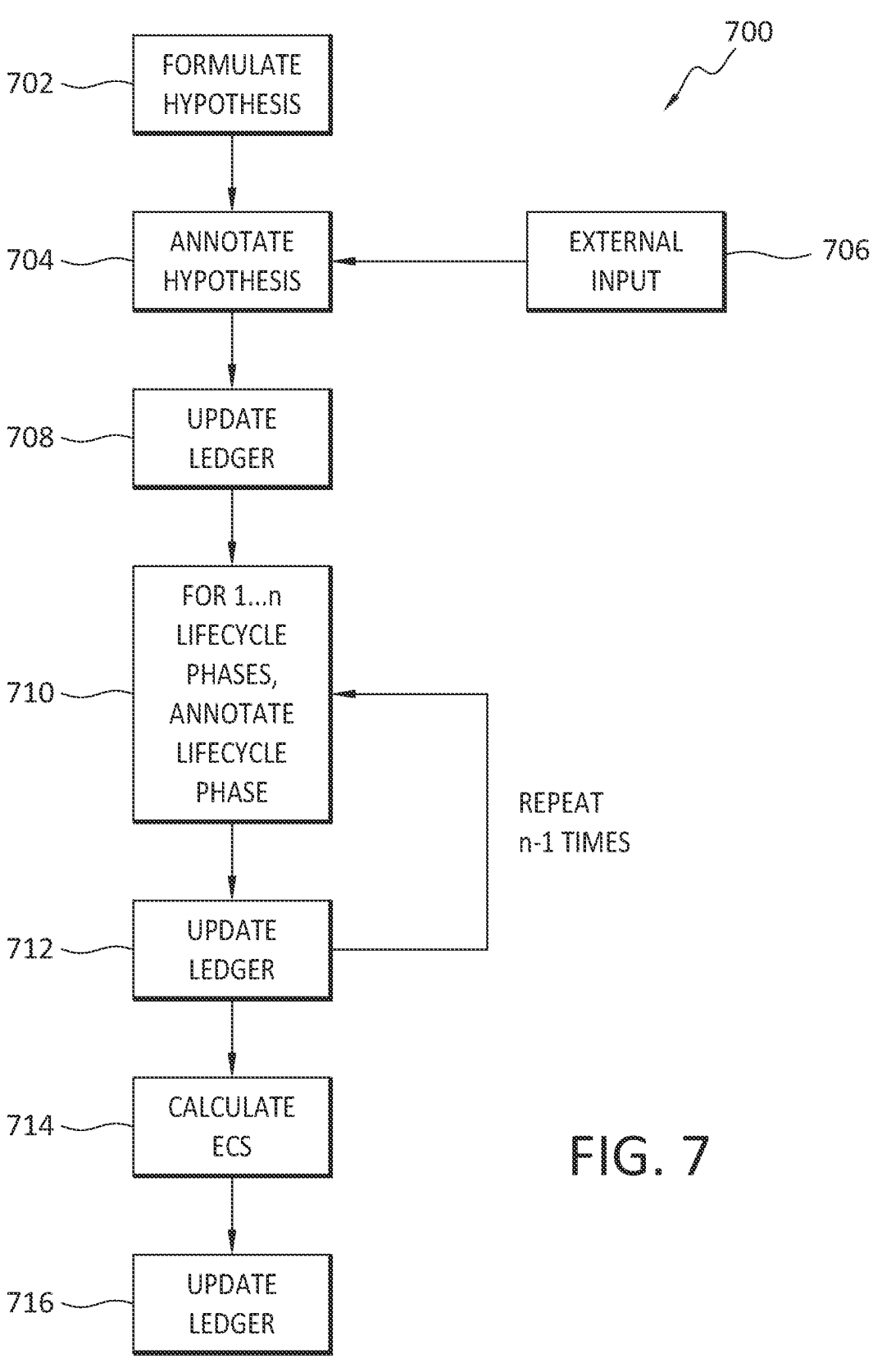
FIG. 7 discloses an example method for measuring ethical algorithm development.

It is noted with respect to the example method 700 of FIG. 7 that any of the disclosed processes, operations, methods, and/or any portion of any of these, may be performed in response to, as a result of, and/or, based upon, the performance of any preceding process(es), methods, and/or, operations. Correspondingly, performance of one or more processes, for example, may be a predicate or trigger to subsequent performance of one or more additional processes, operations, and/or methods. Thus, for example, the various processes that may make up a method may be linked together or otherwise associated with each other by way of relations such as the examples just noted. Finally, and while it is not required, the individual processes that make up the various example methods disclosed herein are, in some embodiments, performed in the specific sequence recited in those examples. In other embodiments, the individual processes that make up a disclosed method may be performed in a sequence other than the specific sequence recited.

Directing attention now to FIG. 7, the method 700 may begin with formulation of a hypothesis 702 that may serve as the basis for development of a model, such as a computational model that may comprise and/or implement AI (artificial intelligence) in the solution of a problem, or problems. The hypothesis may be annotated 704, such as with ethics metadata for example. Some or all of the metadata may be supplied as external input 706 from one or more trusted sources, and/or some or all of the metadata may be supplied internally by an entity that is developing the model. In either case, the annotated hypothesis, and the annotations, may be used to update 708 a ledger of ethics information for the model.

Next, each of 'n' lifecycle phases of a model development lifecycle may be annotated 710 with ethics metadata, and the ledger updated 712 to include the lifecycle phase and associated annotations. This process may be repeated n–1 times, that is, once for each different phase of the model development lifecycle.

Once all the model development lifecycle phases, or a specified subset of the model development lifecycle phases, have been completed and annotated, an ethics confidence score (ECS) may be calculated 714, using one or more equations for example, for the entire model development lifecycle and/or for one or more selected phases of the model development lifecycle. The ledger may then be updated 716 to include any of the ECS, annotations, model, and equation.

E. Further Example Embodiments

Following are some further example embodiments of the invention. These are presented only by way of example and are not intended to limit the scope of the invention in any way.

Embodiment 1. A method, comprising: formulating a hypothesis for development of computing model; annotating the hypothesis with ethics metadata; storing the hypothesis and the ethics metadata, in association with each other, in a ledger; performing 'n' phases of a development lifecycle for the computing model; annotating each of the 'n' phases with ethics metadata specific to the phase; updating the ledger to include the 'n' phases and the ethics metadata respectively associated with each of the 'n' phases; and calculating an ethics confidence score for the computing model and/or for the development lifecycle.

Embodiment 2. The method as recited in embodiment 1, wherein the 'n' phases include any one or more of: a data discovery phase; a data preparation phase; a model planning phase; a model building phase; a results communication phase; and, a model deployment phase.

Embodiment 3. The method as recited in any of embodiments 1-2, wherein the ethics metadata for one or more of the 'n' phases comprises ethics metadata supplied by an enterprise that is developing the computing model and/or ethics metadata supplied by a trusted third party.

Embodiment 4. The method as recited in any of embodiments 1-3, wherein the computing model comprises a data analysis model.

Embodiment 5. The method as recited in any of embodiments 1-4, further comprising storing the ethics confidence score in the ledger.

Embodiment 6. The method as recited in any of embodiments 1-5, wherein the ethics confidence score is calculated based on the respective ethical annotations of one or more of the 'n' phases.

Embodiment 7. The method as recited in any of embodiments 1-6, further comprising storing the model, the ethical annotations, the ethics confidence score, and an equation used to calculate the ethics confidence score, in the ledger.

Embodiment 8. The method as recited in any of embodiments 1-7, further comprising modifying, based on the ethics confidence score, one of the phases of the development lifecycle for the computing model.

Embodiment 9. The method as recited in any of embodiments 1-8, further comprising deploying the computing model in a production environment when the ethics confidence score meets or exceeds a threshold value, and the computing model is not deployed in the production environment when the ethics confidence score falls below the threshold value.

Embodiment 10. The method as recited in any of embodiments 1-9, wherein the annotating of the hypothesis and the annotating of the 'n' lifecycle phases are performed using an ethics confidence fabric.

Embodiment 11. A system, comprising hardware and/or software, for performing any of the operations, methods, or processes, or any portion of any of these, disclosed herein.

Embodiment 12. A non-transitory storage medium having stored therein instructions that are executable by one or more hardware processors to perform operations comprising the operations of any one or more of embodiments 1-10.

F. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon.

Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 8:
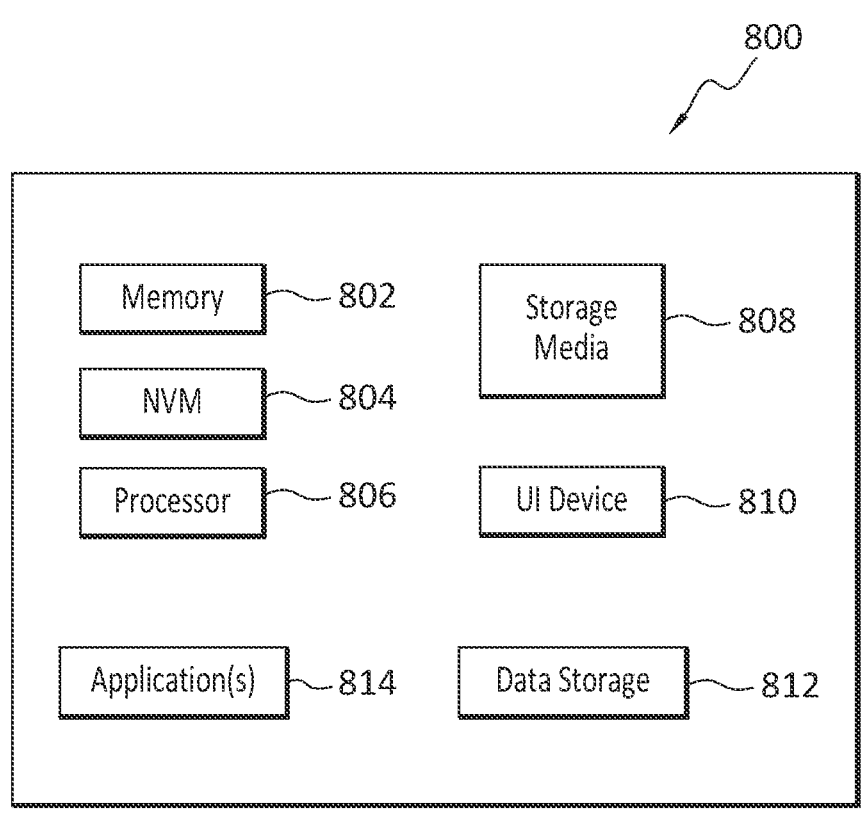
FIG. 8 discloses an example computing entity, comprising hardware and/or software, operable to perform any of the claimed methods, processes, and operations.

With reference briefly now to FIG. 8, any one or more of the entities disclosed, or implied, by FIGS. 1-7 and/or elsewhere herein, may take the form of, or include, or be implemented on, or hosted by, a physical computing device, one example of which is denoted at 800. As well, where any of the aforementioned elements comprise or consist of a virtual machine (VM), that VM may constitute a virtualization of any combination of the physical components disclosed in FIG. 8.

In the example of FIG. 8, the physical computing device 800 includes a memory 802 which may include one, some, or all, of random access memory (RAM), non-volatile memory (NVM) 804 such as NVRAM for example, read-only memory (ROM), and persistent memory, one or more hardware processors 806, non-transitory storage media 808, UI device 810, and data storage 812. One or more of the memory components 802 of the physical computing device 800 may take the form of solid state device (SSD) storage. As well, one or more applications 814 may be provided that comprise instructions executable by one or more hardware processors 806 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:

formulating a hypothesis for development of a computing model;

annotating the hypothesis with first ethics metadata;

storing the hypothesis and annotations regarding the first ethics metadata, in association with each other, in a ledger;

performing 'n' phases of a development lifecycle for the computing model, wherein 'n' is greater than or equal to four;

annotating each of the 'n' phases with second ethics metadata specific to the phase;

updating the ledger to include the 'n' phases and annotations regarding the second ethics metadata respectively associated with each of the 'n' phases; and calculating an ethics confidence score for the computing model and/or for the development lifecycle based on the annotations of the hypothesis regarding the first ethics metadata and the annotations of each of the 'n' phases regarding the second ethic metadata, wherein the 'n' phases include a data discovery phase, in which data that helps prove the hypothesis is discovered, and wherein common ethics metadata is included in the first ethics metadata and the second ethics metadata.

2. The method as recited in claim 1, wherein the 'n' phases further include any one or more of: a data preparation phase;

a model planning phase; a model building phase; a results communication phase; and, a model deployment phase.

3. The method as recited in claim 1, wherein the second ethics metadata for one or more of the 'n' phases comprises ethics metadata supplied by an enterprise that is developing the computing model and/or ethics metadata supplied by a trusted third party.

4. The method as recited in claim 1, wherein the computing model comprises a data analysis model.

5. The method as recited in claim 1, further comprising storing the ethics confidence score in the ledger.

6. The method as recited in claim 1, wherein the ethics confidence score is calculated based on the respective annotations of one or more of the 'n' phases.

7. The method as recited in claim 1, further comprising storing the model, the annotations regarding the first ethics metadata, the annotations regarding the second ethics metadata, the ethics confidence score, and an equation used to calculate the ethics confidence score, in the ledger.

8. The method as recited in claim 1, further comprising modifying, based on the ethics confidence score, one of the 'n' phases of the development lifecycle for the computing model.

9. The method as recited in claim 1, further comprising:
deploying the computing model in a production environment when the ethics confidence score meets or exceeds a threshold value,
wherein the computing model is not deployed in the production environment when the ethics confidence score falls below the threshold value.

10. The method as recited in claim 1, wherein the annotating of the hypothesis and the annotating of the 'n' phases are performed using an ethics confidence fabric.

11. A non-transitory storage medium having stored therein instructions that are executable by one or more hardware processors to perform operations comprising:
formulating a hypothesis for development of a computing model;
annotating the hypothesis with first ethics metadata;
storing the hypothesis and annotations regarding the first ethics metadata, in association with each other, in a ledger;
performing 'n' phases of a development lifecycle for the computing model, wherein 'n' is greater than or equal to four;
annotating each of the 'n' phases with second ethics metadata specific to the phase;
updating the ledger to include the 'n' phases and annotations regarding the second ethics metadata respectively associated with each of the 'n' phases; and
calculating an ethics confidence score for the computing model and/or for the development lifecycle based on the annotations of the hypothesis regarding the first ethics metadata and the annotations of each of the 'n' phases regarding the second ethic metadata,
wherein the 'n' phases include a data discovery phase, in which data that helps prove the hypothesis is discovered, and
wherein common ethics metadata is included in the first ethics metadata and the second ethics metadata.

12. The non-transitory storage medium as recited in claim 11,
wherein the 'n' phases further include any one or more of: a data preparation phase; a model planning phase; a model building phase; a results communication phase; and, a model deployment phase.

13. The non-transitory storage medium as recited in claim 11, wherein the second ethics metadata for one or more of the 'n' phases comprises ethics metadata supplied by an enterprise that is developing the computing model and/or ethics metadata supplied by a trusted third party.

14. The non-transitory storage medium as recited in claim 11, wherein the computing model comprises a data analysis model.

15. The non-transitory storage medium as recited in claim 11, wherein the operations further comprise storing the ethics confidence score in the ledger.

16. The non-transitory storage medium as recited in claim 11, wherein the ethics confidence score is calculated based on the respective annotations of one or more of the 'n' phases.

17. The non-transitory storage medium as recited in claim 11, wherein the operations further comprise storing the model, the annotations regarding the first ethics metadata, the annotations regarding the second ethics metadata, the ethics confidence score, and an equation used to calculate the ethics confidence score, in the ledger.

18. The non-transitory storage medium as recited in claim 11, wherein the operations further comprise modifying, based on the ethics confidence score, one of the 'n' phases of the development lifecycle for the computing model.

19. The non-transitory storage medium as recited in claim 11, wherein the operations further comprise deploying the computing model in a production environment when the ethics confidence score meets or exceeds a threshold value,
wherein the computing model is not deployed in the production environment when the ethics confidence score falls below the threshold value.

20. The non-transitory storage medium as recited in claim 11, wherein the annotating of the hypothesis and the annotating of the 'n' phases are performed using an ethics confidence fabric.

* * * * *